Jan. 27, 1931.  J. F. MAYER  1,790,013
INTERNAL COMBUSTION ENGINE
Filed July 2, 1928    2 Sheets-Sheet 1
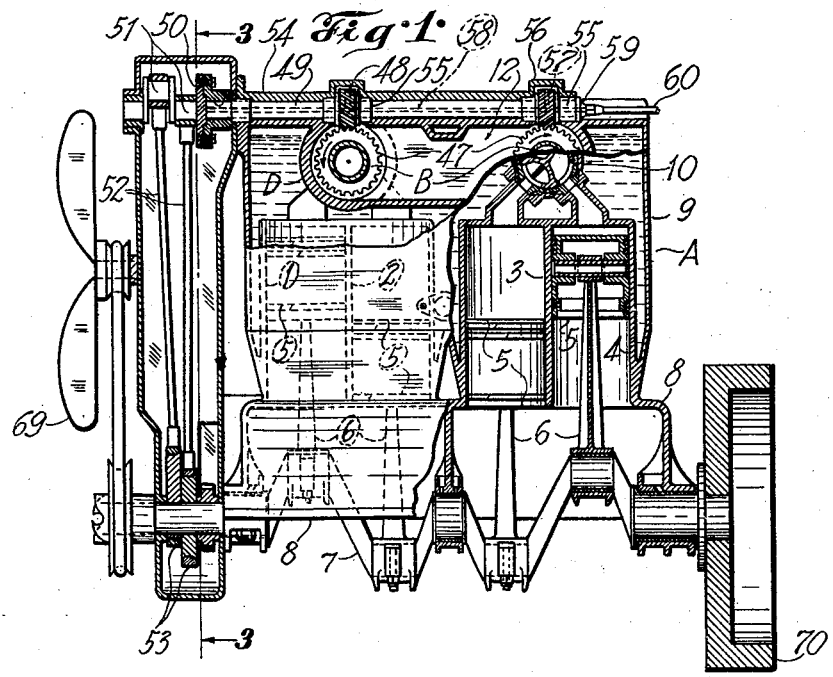
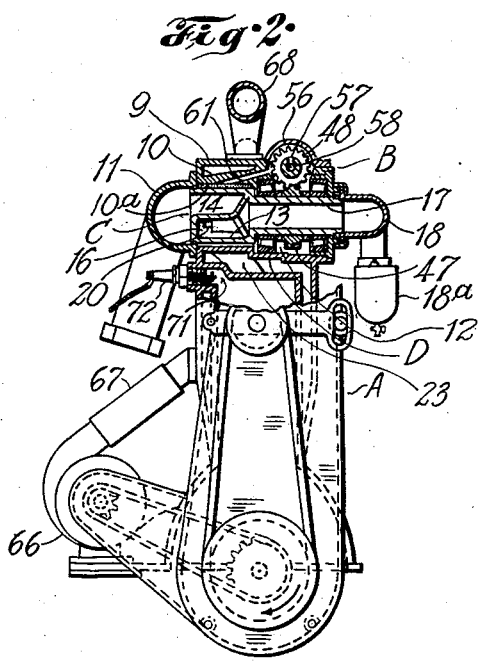
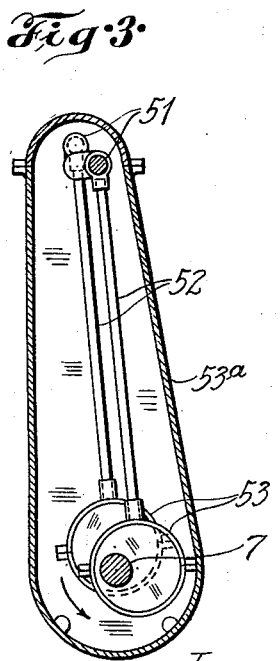
INVENTOR:
JOSEPH F. MAYER,
By
ATTORNEY Jan. 27, 1931.  J. F. MAYER  1,790,013
INTERNAL COMBUSTION ENGINE
Filed July 2, 1928   2 Sheets-Sheet 2
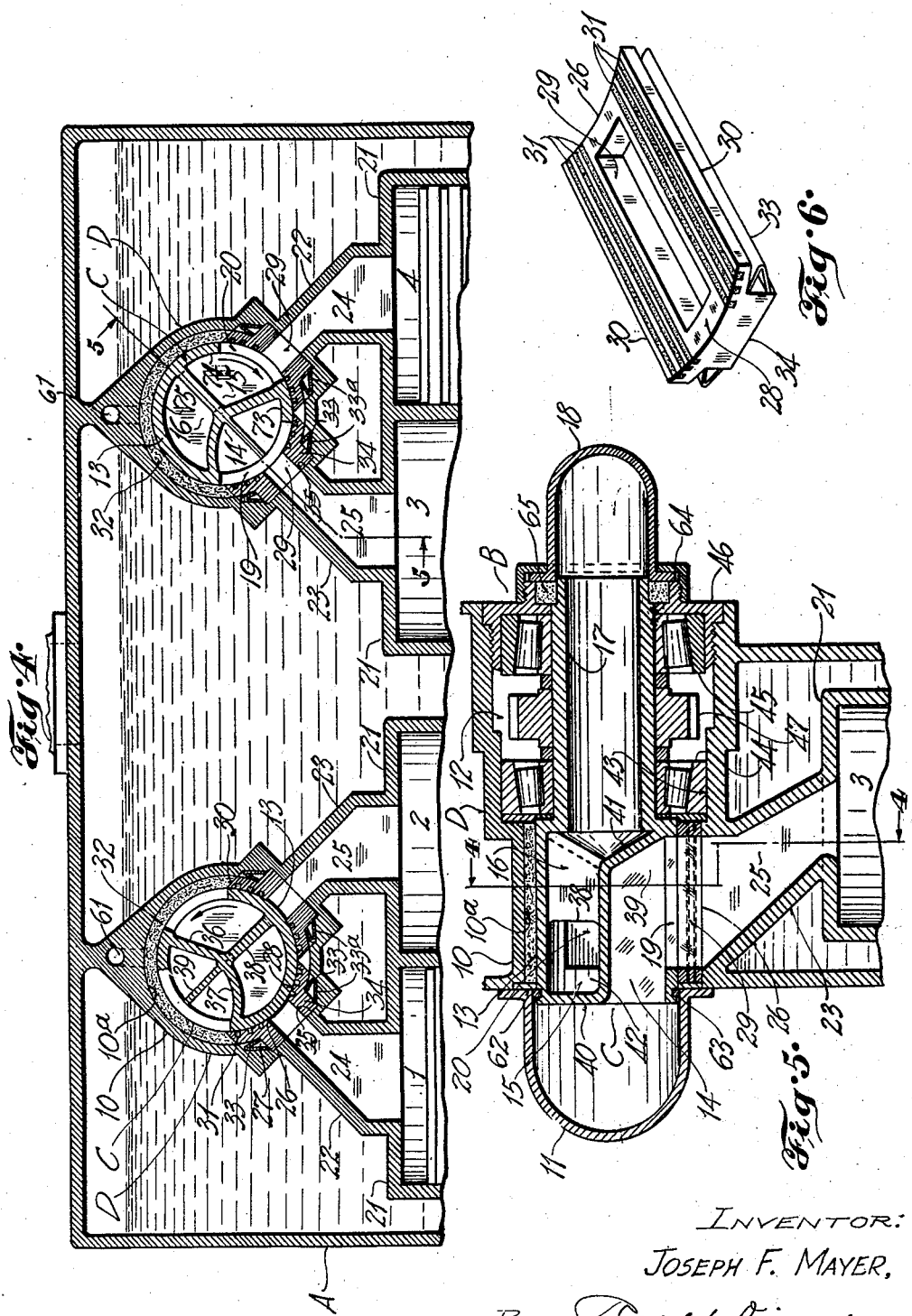
INVENTOR:
JOSEPH F. MAYER,
By ⎯⎯⎯⎯⎯
ATTORNEY Patented Jan. 27, 1931

1,790,013

UNITED STATES PATENT OFFICE

JOSEPH F. MAYER, OF ST. LOUIS, MISSOURI

INTERNAL-COMBUSTION ENGINE

Application filed July 2, 1928. Serial No. 289,643.

This invention relates to a certain new and useful improvement in internal combustion engines.

My invention has for an object the provision of an efficient engine of the type stated having an axially rotatable chambered valve for controlling the intake and discharge of a companion pair of cylinders.

My invention has for another object the provision of an engine of the type stated having a valve chamber common to each pair of cylinders, and passages leading from the valve chamber into the respective cylinders, each passage serving as a common or combined inlet and outlet to and from its respective cylinder.

My invention has for still another object the provision in an engine of the type described of a rotary chambered valve for controlling the intake and discharge of a companion pair of cylinders, the valve including ported intake and exhaust-chambers circumferentially adjacent on one side of the valve and separated by an intake preheating chamber on the other side of the valve communicating with said intake chamber, each of said intake and exhaust chambers having a single port adapted for communication with each of said cylinders in turn, the ports being circumferentially aligned one with the other and the port of the exhaust chamber being preferably adjacent the port of the intake-chamber.

My invention has for a further object the provision in a rotary valve engine of the type stated of a unique form and location of packing to obviate leakage between the valve and the cylinders, and in connection with said packing to provide an efficient form of lubrication to the valve and its seat including a replaceable solid lubricant incorporated in said seat and an oil-absorbing material embracing the valve in the valve chamber.

My invention has for a still further object the provision in a rotary valve engine of a valve operating mechanism, including a valve shaft operatively geared to the rotary valve and having a pair of cranks in quadrature driven by eccentrics disposed likewise on the crank shaft of the engine.

My invention has for an additional object the provision in a rotary valve engine of a valve having an exhaust chamber including a baffle means for directing the movement of gases therethrough to prevent the formation of whorls or eddies in said gases, said baffle being disposed in the direction of movement of said gases to divide the same into parallel streams in said chamber.

My invention has for another additional object the provision in an engine of a rotary valve supported by a hollow shaft in a water-cooled bearing chamber disposed away from the exhaust passages of the valve and engine, the interior of said hollow shaft serving also as a passage leading from the intake manifold of the engine to the preheating chamber of the valve.

And with the above and other objects in view, my invention resides in the novel features of form, construction, arrangement, and combination of parts hereinafter described and pointed out in the claims.

In the accompanying drawings,—

Figure 1 is a side elevational view, partly in section, of a four-cylinder internal combustion engine embodying my invention;

Figure 2 is a front end view of Figure 1, portions of the valve mechanism of the front pair of cylinders being shown in section;

Figure 3 is a sectional view along approximately the line 3—3, Figure 1;

Figure 4 is an enlarged fragmentary sectional view along approximately the line 4—4, Figure 5;

Figure 5 is a fragmentary sectional view along approximately the line 5—5, Figure 4; and Figure 6 is an enlarged perspective elevation of one of the valve-seats.

Referring now more in detail and by reference characters to the drawings, which illustrate a preferred embodiment of my invention, the engine may have or comprise an engine block A formed with one or more pairs of cylinders adapted to be fired in a certain sequence. In the present engine, there are shown two pairs of cylinders 1 to 4, inclusive, and working and adapted for reciprocation within the cylinders, are pistons 5 connected by respective connecting-rods 6 to the crankshaft 7 rotatably supported in the crankcase 8. The latter may form a unitary structure with the engine block A, which also includes a water-jacket 9 provided around and united to said cylinders, as shown, for usual cooling purposes.

Disposed horizontally in the engine block A and transversely intermediate the cylinders of each respective pair, is a valve-assembly B mounted in a housing D having a cylindrical valve chamber 10, the bore 10a of which opens at one end into the exhaust manifold 11 of the engine and at its other end into a bearing chamber 12 containing the driving and supporting elements for the valve assembly B, which chamber 12 may be formed in common with both valve assemblies B, as indicated in Figure 1. Preferably both housings D are enclosed by the water jacket 9.

Forming part of the valve assembly B and mounted for axial rotation in the respective valve chamber 10 for the purpose of controlling the intake and discharge of a companion pair of cylinders, is a rotary valve C which includes a tubular valve body 13 having an exhaust-chamber 14 communicating with the exhaust-manifold 11 and an intake-chamber 15 communicating through a preheating chamber 16 with the interior of a hollow shaft or tubular member 17 presented endwise from, and preferably integral with, the valve body 13, the hollow shaft 17, in turn, communicating with the intake manifold 18.

The exhaust-chamber 14 and the intake-chamber 15 are circumferentially adjacent on one side of the valve body 13 and are separated or spaced on the other side of the valve body by the preheating-chamber 16 (Figure 4). Preferably, in adjacent circumferential alignment in the wall of the tubular body 13 for communication with each of the cylinders, as 3, 4, in turn, are an exhaust port 19 leading into the exhaust-chamber 14 and an intake port 20 leading from the intake-chamber 15, the ports 19, 20, being of such relative dimensions that, on rotation of the valve C, the one cylinder is exhausting through port 19 while the companion cylinder is intaking through port 20 (Figure 4).

Convergingly presented from each of the cylinder ends 21, 21 of the companion pair of cylinders, as 3, 4, are integral supporting necks 22, 23, connecting with the valve chamber 10, each provided with a passage 24, 25, respectively, leading obliquely downwardly from the bore 10a to its respective cylinder, the openings of the respective passages 24, 25, being spaced at an angle of approximately 90 degrees in circumferential alignment in said bore 10a.

The passages 24, 25, serve as common or combined inlet and discharge ports for their respective cylinders, as 3, 4, and the valve ports 19, 20, are so relatively located that, when the valve body 13 is rotated, the ports 19, 20, are adapted for registration, in turn, with the cylinder port 24, and thereafter, in turn, with the cylinder port 25, in proper sequence for the operation of the engine, as indicated in Figure 4. Like ports 24, 25, leading into the other pair of cylinders 1, 2, serve a like purpose in co-operation with the ports 19, 20 of the respective valve body 13 associated therewith.

To prevent circumferential leakage between the valve body 13 and the wall of the chamber 10, an apertured valve-seat or packing 26, best seen in Figure 6, is fitted for slidable radial movement in a radially presented recess 27 formed in the wall of the chamber 10 at and around one, or the upper, end of each of the cylinder ports 24, 25. The seat or packing 26 is of such relative dimensions to extend laterally on all sides of the particular port opening, and its upper or valve engaging face 28 is of arcuate shape or contour complementary to the valve body 13, the respective apertures or ports 29 of said seats 26 suitably registering with the valve ports 19, 20, to provide the proper lap to said registration as may be required for the operation of the engine.

Replaceably or renewably inset in the circumferentially extending lateral portions 30 of the valve engaging face 28 of the valve-packing 26, is a plurality of longitudinally or axially extending graphite strips or other like solid lubricating elements 31, and disposed annularly between the wall of the bore 10a and the valve-body 13, is a packing or seat lining 32, preferably of elastic oil-absorbing incombustible material, such as asbestos fabric, yieldingly embracing approximately one-half of the periphery of the valve member 13 to abut the exposed lateral portions 30 of the respective seats 26. Each of said valve seats 26 is yieldingly engaged with the periphery of the valve body 13 by resilient elements 33, preferably expansibly folded strips of spring metal, best seen in Figure 6, which are seated between said lateral portions 30 and the radially adjacent obliquely lateral walls 33a of said recess 27, so as to slidably engage their free edges with the under-body 34 of said seat 26. The under body 34 is nicely fitted to the walls of a seat 35 forming a continuation of the recess 27, and the strips of spring metal 33 are likewise fitted to the end walls of the recess 27, for the purpose of preventing leakage between the companion pairs of cylinders under the opposed portions of the adjacent valve seats 26. The respective apertures or ports 29 of the valve-seats 26 are thus suitably registered with the respective cylinder ports 24, 25, to isolate the one from the other.

I prefer to construct the chambered rotary valve body 13 in the form of a tubular member interiorly chambered by axially meeting approximately radial partitions 36, 37, 38, united to the wall of said tubular member 13, to define the exhaust chamber 14 between the partitions 36 and 37, the intake chamber 15 between the partitions 37 and 38, and the preheating chamber 16 between the partitions 38 and 36.

The exhaust chamber 14 is open-ended toward the exhaust-manifold 11 for direct continuous communication therewith and is also axially subdivided by a radial partition 39, but the other chambers are closed at the exhaust end by an end wall 40. The preheating chamber 16 is open-ended toward the hollow shaft 17 for direct continuous communication with the interior thereof, but the other chambers are closed at the inlet end by a dished end wall 41. The partition 38 terminates short of the end wall 40 to provide a port or opening 42 communicating the chambers 15 and 16 (Figure 5). The hollow shaft 17 is axially presented from the intake end of, and preferably, as stated, united integrally with, the valve body 13 (Figure 5), and is rotatably supported in a radial-thrust bearing 44 disposed in a bore 43 in the bearchamber 12 adjacent the valve chamber 10 and a like radial-thrust bearing 45 oppositely mounted in an axially apertured head 46 removably supported in the outer side wall of the bearing chamber 12, whereby the valve C is revolvably supported in the housing D.

Fixed between the bearings 44 and 45 on the hollow shaft 17 of each of the respective valves C, is a gear 47, which gears mesh with respective worms 48 disposed upon a valve-operating or drive-shaft 49 suitably mounted for rotation upon the engine, and in order that adjacent gears 47 may be reversely driven, for a purpose hereinafter appearing, the teeth of such adjacent gears and worms are reversely cut, as indicated in Figure 1. Mounted in quadrature on a plate clutch 50 fixed on one or the front end of said shaft 49 for rotation thereof, is a pair of cranks 51, each crank being operatively connected by a suitable connecting rod 52 to its corresponding one of a pair of eccentrics 53 mounted in like quadrature on the crank shaft 7, the whole being enclosed in a suitable housing 53a.

Communicating with the respective bearing chambers 12 and forming part of a drive shaft housing 54 having suitable bearings or bushings 55 abutting each side of the worms 48 for rotatably supporting the shaft 49 therein, are gear chambers 56 enclosing the worms 48 to catch the lubricant thrown therefrom through a radial oil-port 57 leading from an axial oil-duct 58 provided in and opening at the rear end of said shaft 49, said rear end of the shaft 49 being coterminous with the rearmost bushing 55, the open end of which is closed by an oil-cap 59 connecting said oil-duct 58 with an oil pipe 60 leading from said cap to a suitable source of oil supply (not shown).

Leading obliquely downwardly from each gear chamber 56 to the respective bore 10a for supplying lubricant to the oil-absorbing lining 32, is a passage 61 (Figure 2), escape of oil into the exhaust manifold 11 being prevented by a retaining ring 62 nicely fitting the exhaust end of the valve body 13 and engaged between the manifold 11 and the valve chamber 10, in conjunction with a packing ring 63 set in the valve body 13 for contact with the walls of the exhaust manifold 11 (Figure 5).

The intake or outer end of the hollow shaft 17 extends through a stuffing box 64 on the apertured head 46 into the intake manifold 18, for direct continuous communication therewith, leakage therebetween being prevented by a suitable packing 65. Thus the intake chamber 15, through the chamber 16 and hollow shaft 17, is in continuous communication with the intake manifold 18.

The several parts are disposed and have relative dimensions so that the entire valve assembly B, including the valve C, bearings 44 and 45, head 46, and gear 47, may be removed axially endwise from the housing D, subsequent, of course, to the removal of the packing ring 63 from the valve body 13, and preferably also, the removal of the shaft 49 from the housing 54, said housing being preferably split lengthwise for this purpose, as indicated in Figure 2.

Cooling water for the jacket 9 is circulated by a suitably operated pump 66 through an inlet pipe 67 leading to the jacket 9 and an outlet pipe 68 leading therefrom in the customary manner. At the front end of the engine is the usual belt driven adjustably mounted fan 69, and on the rear end of the crankshaft 7 is mounted the customary flywheel 70. Each cylinder 1, 2, 3, 4, has connecting directly therewith and extending through the water jacket 9 an auxiliary passageway 71 preferably of a size and shape to receive a standard spark plug 72, a standard carbureter 18a being associated with the intake manifold 18.

The valve ports 19, 20 may include all or any desired portion of the walls of the tubular member 13 bounding the respective chambers 14, 15 to properly "time" the several cycles of the engine. Thus by properly disposing each aperture 29 in the respective valve seats 26, and preferably separating the valve port 19 from the valve port 20 by a suitable lap or wall portion 73 (Figure 4) to prevent cross communication of the chambers 14, 15 through the said apertures 29, I am able to nicely time the exhaust cycle of the respective companion cylinders, as 3, 4, as indicated in Figure 4. Likewise, a suitable cut off or wall portion 74 of the bounding wall of the chamber 15 is disposed to control the intake cycle of the cylinders 3, 4 and thereafter, in conjunction with the bounding wall 75 of the chamber 16, to serve as an abutment during the compression and firing cycles of said companion cylinders, as indicated in Figure 4, in connection with cylinders 1, 2, wherein is shown the other valve C associated similarly with the said cylinders 1, 2.

I may add that the valve ports 19, 20, and the valve-seats 26 and their apertures 29 may be of any convenient shape suitably to conform with the disposition of the parts of the engine and, to such end, may be circular, square, or rectangularly oblong in contour although I have shown in my present embodiment thereof a rectangularly oblong valve-seat, aperture and ports. It will be understood also that the engine block A may be horizontally split in the usual manner just below the cylinder ends 21 to permit the ready removal from the engine of the valve-assemblies B and associated parts.

In use and operation, briefly, the shaft 49 is driven at crank-shaft speed by the eccentrics 53, connecting rods 52 and cranks 51 as heretofore set forth, each valve C being rotated at half crank-shaft speed, whereby its exhaust chamber 14 communicates, for example, with the cylinders 1, 2, as by the port 19 registering, in proper sequence, with the passages 24, 25, the burnt gas being discharged through these passages into the exhaust manifold 11 from the cylinders of the pair in corresponding sequence. In their passage through the exhaust chamber, said gases tend to form whorls or eddies, said tendency being prevented in a simple and effective manner by the baffle 39, which directively extends in the direction of movement of said gases to divide the same into parallel streams in said chamber.

Similarly, the intake chamber 15 is, in turn, connected with said cylinders as by the port 20 registering in proper sequence, after the said registration of the port 19, with the passages 24, 25, the gas charge being now drawn through these passages into the cylinders of the pair in corresponding sequence. In its passage through the valve body 13 said gas charge passes through the pre-heating chamber 16, where it comes in heating contact with the partition 37 heated by the exhaust gases passing through the adjacent exhaust chamber 14, and thence through the intake chamber 15, where the gas charge is further heated in contact with the partition 36 likewise heated by the exhaust gases in the adjacent exhaust chamber 14.

As hereinbefore set forth, the valves C are reversely driven, and they are also preferably constructed in opposite hands, that is to say, the exhaust port 19 leads the intake port 20 in order to accommodate the device to the usual construction of a four-cylinder engine, wherein the end cylinders 1 and 4 have their respective pistons 5 on their up-stroke while the pistons of the inside cylinders 2 and 3 are on their down-stroke. It follows, therefore, that the firing of the respective cylinders is in the order 1, 2, 4, 3; thus in Figure 4, cylinder 1 is firing, cylinder 2 compressing, cylinder 3 exhausting, and cylinder 4, intaking.

Oil from a suitable source, not shown, is supplied to the pipe 60 and thence through the cap 59 to the oil duct 58 for discharge through the oil ports 57 in the gears 48 into the gear chambers 56. On rotation of said gears 48, the oil is thrown against the walls of said chamber 56, some of which trickles down into the passage 61 leading to the bore 10a for supplying lubricant to the lining 32, the remainder of the oil being discharged into the bearing chamber 12 for lubrication of the moving parts therein. The oil supplied to the lining 32 is absorbed thereby to form a lubricated seat in the bore 10a for the valve body 13. Likewise, the graphite strips 31 in the valve-engaging face 28 of the valve seats 26 furnish an efficient form of lubrication between said seats 26 and the valve body 13. These lubricants are subjected to the heat of the hot gases in and from the engine, but the lubricants and moving parts in the bearing chamber, and said chamber itself, are removed from contact with said hot gases. The housing D and its contained parts are adapted to be rapidly and efficiently cooled by suitable means, as water circulating in the jacket 9, and the valve C is also effectually cooled by the heat abstracted by the intake gases passing through the chambers 15, 16, and contacting with and against the walls thereof.

Thus, it will be seen that my new engine has a plurality of cylinders in pairs, each pair of cylinders supporting and being associated with a rotary valve assembly, the several valve assemblies being removably contained in chambers adapted for rapid and efficient cooling thereof, and the rotary valves being driven by a common means operatively connected by a simple and effective mechanism with the crank shaft of the engine; that, in connection with the rotary valves, valve-seats or packing members are provided adapted to prevent leakage between the valve and the wall of the bore wherein the valve is rotatably positioned; that a simple and effective means is provided for supplying lubricants to, and lubricating the several moving parts of, the valve assembly; that lubricated seats are provided for the rotary valves adapted to withstand the heat from the hot gases incident to the operation of the engine; and that means is provided for preheating the intaking gas charge by heat abstracted from said hot gases and for cooling the rotary valve by abstracting heat therefrom for said preheating effect. My engine may be economically manufactured, and produced and has been found exceedingly efficient in operation.

It is to be understood that changes in the form, construction, arrangement, and combination of the several parts of my engine may be made and substituted for those herein shown and described without departing from the nature and principle of my invention.

Having thus described my invention, what I claim and desire to secure by Letters Patent is:

1. In an internal combustion engine, a pair of cylinders each having a combined intake and exhaust port, in combination with an axially rotatable valve including exhaust and intake chambers circumferentially adjacent on one side of the valve and a preheating chamber having direct continuous communication with said intake chamber disposed on the other side of the valve between said exhaust and intake chambers, each of said exhaust and intake chambers having a port for communication in sequence with the ports of the cylinders.

2. In an internal combustion engine, a pair of cylinders each having a combined intake and exhaust port, in combination with an axially rotatable valve including exhaust and intake chambers circumferentially adjacent on one side of the valve and a preheating chamber having direct continuous communication with said intake chamber disposed on the other side of the valve between said exhaust and intake chambers, each of said exhaust and intake chambers having a port for communication in sequence with the ports of the cylinders, and means for preventing eddy currents in the gases in said exhaust chamber.

3. In an internal combustion engine, a pair of cylinders each having a combined intake and exhaust port, in combination with an axially rotatable valve including a tubular valve body having interiorly disposed axially meeting radial partitions defining in circumferential sequence an exhaust chamber, an intake chamber, and a preheating chamber having direct continuous communication with the intake chamber, each of said exhaust and intake chambers having a port for communication in sequence with the ports of the cylinders.

4. In an internal combustion engine, a pair of cylinders each having a combined intake and exhaust port, in combination with an axially rotatable valve including a tubular valve body having interiorly disposed axially meeting radial partitions defining in circumferential sequence an exhaust chamber, an intake chamber, and a preheating chamber having direct continuous communication with the intake chamber, each of said exhaust and intake chambers having a port for communication in sequence with the ports of the cylinders, said exhaust chamber also having an axially extending radial partition for preventing eddy currents in the gases passing therethrough.

5. In an internal combustion engine, a pair of cylinders each having a combined intake and exhaust port, in combination with an axially rotatable valve including a tubular valve body having at one end interiorly disposed axially meeting radial partitions defining in circumferential sequence an exhaust chamber, an intake chamber, and a preheating chamber having direct continuous communication with the intake chamber, each of said exhaust and intake chambers having a port for communication in sequence with the ports of the cylinders.

6. In an engine, a valve body having a chamber adapted to receive moving gases therethrough, and means for directing the movement of gases, said means including a baffle member disposed in said chamber parallel with the direction of said movement of said gases, to divide said gases into parallel streams in said chamber.

7. A valve for an internal combustion engine comprising a body divided into chambers, there being one chamber having communication with the exhaust port of the engine, and a plurality of other chambers having direct continuous communication with each other and the inlet port of the engine, the exhaust chamber and one of the inlet chambers each having a port for communication with a cylinder of the engine.

8. A valve for an internal combustion engine comprising a body divided into an exhaust chamber and a plurality of inlet chambers, the inlet chambers having direct continuous communication with each other for circulation of the inlet gases through the valve body, the exhaust chamber and one of the inlet chambers each having a port for communication with a cylinder of the engine.

9. A valve for an internal combustion engine comprising a body divided into an exhaust chamber and a plurality of inlet chambers, portions of the walls of the inlet chambers being in common with the like walls of the exhaust chamber, the inlet chambers having direct continuous communication with each other for circulation of the inlet gases through the valve body, the exhaust chamber and one of the inlet chambers each having a port for communication with a cylinder of the engine.

10. A valve for internal combustion engine comprising a body divided into an exhaust chamber and a plurality of inlet chambers, adjacent inlet chambers having direct continuous communication at an end for circulation of the inlet gases therethrough, and the exhaust chamber and one of the inlet chambers each having a port for communication with a cylinder of the engine.

11. A valve for an internal combustion engine comprising in combination a body divided into an exhaust chamber and a plurality of inlet chambers, adjacent inlet chambers having direct continuous communication at an end for circulation of the inlet gases therethrough, the exhaust chamber and one of the inlet chambers each having a port for communication with a cylinder of the engine, and means on said body for actuation of the valve in operative relation with the engine.

12. A rotary valve for an internal combustion engine comprising a tubular body longitudinally divided into an exhaust chamber, an inlet chamber, and a preheating chamber, the inlet and preheating chambers having direct continuous communication at an end for the circulation of the inlet gases therethrough in contact with portions of the walls of the exhaust chamber, the exhaust chamber and the inlet chamber each having a port for communication with a cylinder of the engine.

13. A rotary valve for an internal combustion engine comprising a tubular body longitudinally divided into an exhaust chamber and a plurality of inlet chambers, the inlet chambers having direct continuous communication at an end for circulation of the inlet gases longitudinally through said body in opposite direction, the exhaust chamber and one of the inlet chambers each having a port for communication with a cylinder of the engine.

In testimony whereof, I have signed my name to this specification.

JOSEPH F. MAYER.